United States Patent
Brutschin et al.

(10) Patent No.: US 6,920,787 B2
(45) Date of Patent: Jul. 26, 2005

(54) APPARATUS FOR DETERMINING AND/OR MONITORING THE FILLING LEVEL OF A FILLING MATERIAL IN A CONTAINER

(75) Inventors: Wolfgang Brutschin, Schopfheim (DE); Sergei Lopatin, Lörrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/275,274
(22) PCT Filed: May 8, 2001
(86) PCT No.: PCT/EP01/05207
 § 371 (c)(1),
 (2), (4) Date: Apr. 29, 2003
(87) PCT Pub. No.: WO01/86236
 PCT Pub. Date: Nov. 15, 2001

(65) Prior Publication Data
 US 2003/0159506 A1 Aug. 28, 2003

(30) Foreign Application Priority Data
 May 10, 2000 (DE) .......................... 10022891

(51) Int. Cl.$^7$ .............................. G01F 23/00
(52) U.S. Cl. ............. 73/290 V; 340/620; 340/621; 340/612
(58) Field of Search .............. 73/290 V; 340/620, 340/621, 612

(56) References Cited

U.S. PATENT DOCUMENTS

| | | | | |
|---|---|---|---|---|
| 3,625,058 A | * | 12/1971 | Dress et al. | 73/290 V |
| 5,743,134 A | * | 4/1998 | Dreyer | 73/290 V |
| 5,844,491 A | * | 12/1998 | Getman et al. | 340/612 |
| 5,966,983 A | | 10/1999 | Pfeiffer et al. | |
| 6,138,507 A | * | 10/2000 | Getman et al. | 73/290 V |
| 6,644,116 B2 | * | 11/2003 | Getman et al. | 73/290 V |

FOREIGN PATENT DOCUMENTS

| | | |
|---|---|---|
| DE | 4429236 A1 | 3/1996 |
| EP | 0875740 A1 | 11/1998 |
| EP | 0985916 A1 | 3/2000 |

* cited by examiner

Primary Examiner—Hezron Williams
Assistant Examiner—André K. Jackson
(74) Attorney, Agent, or Firm—Bacon & Thomas

(57) ABSTRACT

The invention relates to a device for determining and/or monitoring the level of a filling material in a container. According to the invention, an oscillatable unit is provided which is fastened to a membrane, whereby said oscillatable unit is mounted at the height of the predetermined level. An emitting-receiving unit is provided which, with a given emit frequency, causes the membrane and the oscillatable unit to oscillate, and which receives the oscillations of the oscillatable unit. A control/evaluation unit is provided, which identifies once the predetermined level is obtained upon a given change in frequency or which, with the aid of the oscillation frequency of the oscillatable unit, determines the density of the filling material.

7 Claims, 5 Drawing Sheets

● Solder
○ Adhesive
◌ SMD adhesive

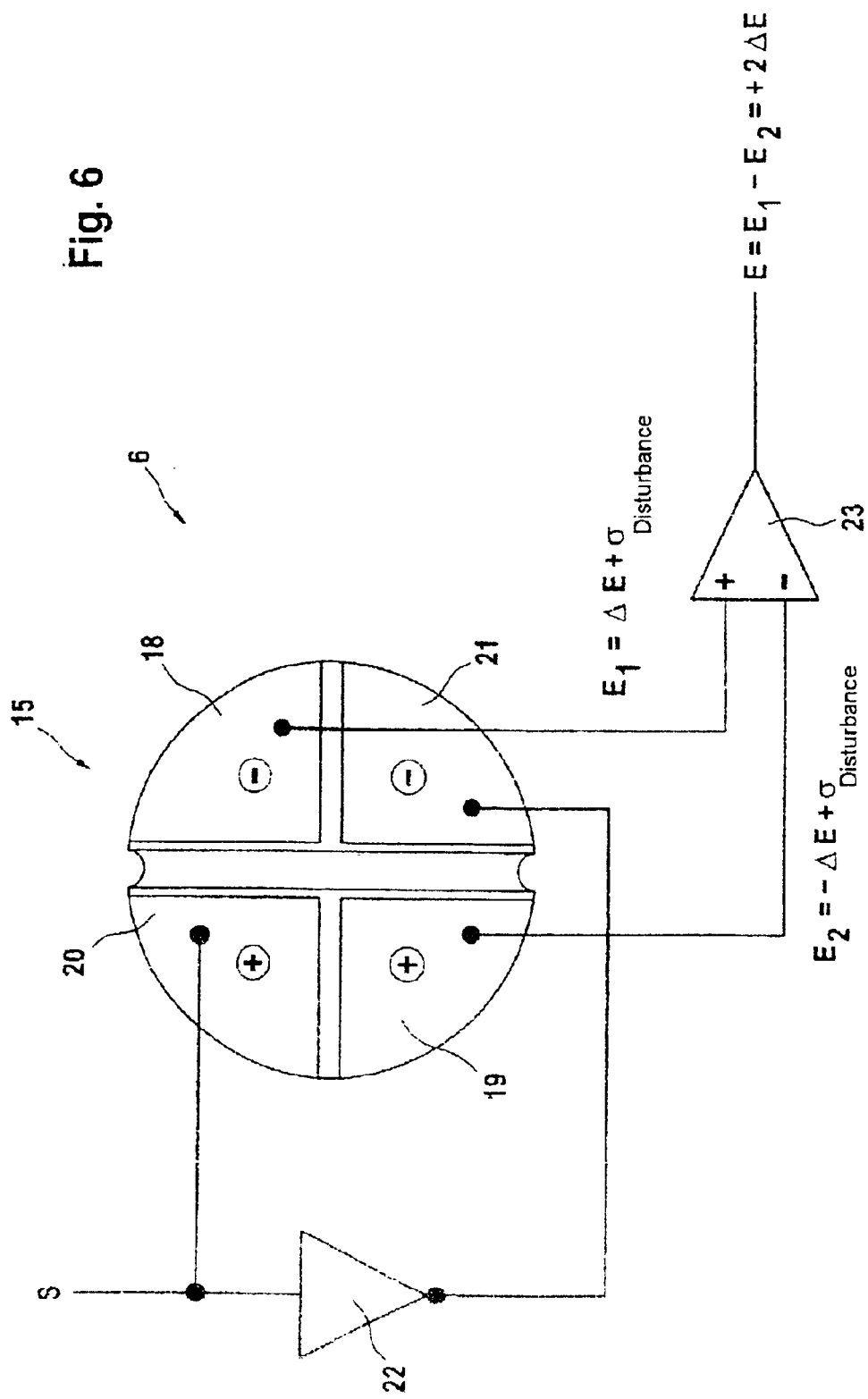

APPARATUS FOR DETERMINING AND/OR MONITORING THE FILLING LEVEL OF A FILLING MATERIAL IN A CONTAINER

FIELD OF THE INVENTION

The present invention relates to an apparatus for determining and/or monitoring the filling level of a filling material in a container and for determining the density of a medium in the container.

The apparatus comprises a unit which can oscillate and is attached to a membrane which can oscillate and which is fitted at the same level as the predetermined filling level, the unit being fitted such that it enters the filling material to a defined immersion depth, a transmitting/receiving unit which causes the membrane and the unit which can oscillate to oscillate at a pre-determined transmission frequency and which receives the oscillations from the unit which can oscillate, and a control/evaluation unit which identifies that the predetermined filling level has been reached as soon as a predetermined frequency change occurs, or which determines the density of the medium on the basis of the oscillation frequency of the unit which can oscillate.

BACKGROUND OF THE INVENTION

Vibration detectors in the form of filling level measurement devices make use of the effect of the oscillation frequency and the oscillation amplitude are dependent on the respective extent to which the oscillating element is covered, while the oscillating element is in free space and can oscillate without any damping, it experiences a frequency and amplitude change as soon as it is partially or completely immersed in the filling material. As a consequence, it is possible to clearly determine when the filling material from the container has reached the predetermined filling level, on the basis of a predetermined frequency change (normally, the frequency is measured). In general, filling level measurement devices are used primarily to provide protection against overfilling or for protection against pumps running on no load.

Furthermore, the damping of the oscillation of the oscillating element is also influenced by the respective density of the filling material. When covered to a constant extent, there is thus a functional relationship with the density of the filling material so that vibration detectors are very highly suitable for determining not only filling levels but also densities. In practice, in order to monitor and identify the filling level and/or the density of the filling material in the container, the oscillations of the membrane are recorded, and are converted into electrical received signals by means of at least one piezoelement. The received electrical signals are then evaluated by evaluation electronics. When determining a filling level, the evaluation electronics monitor the oscillation frequency and/or the oscillation amplitude of the oscillating element and signal the "sensor covered" or "sensor uncovered" state as soon as the measured values fall below or rise above a predetermined reference value. An appropriate message can be passed to the operator by visual and/or audible means. Alternatively or additionally, a switching process is initiated; by way of example, an inlet or outlet valve on the container is opened or closed.

EP 0 985 916 A1 discloses an extremely advantageous variant of a transmitting/receiving unit, via which, firstly, the membrane of the vibration detector is caused to oscillate and via which, secondly, the oscillations of the membrane are recorded and are converted into electrical signals. The transmitting electrode and the receiving electrode are each essentially semicircular in shape and are arranged on the same face of a piezoelectric element in the form of a disk; the piezoelectric element itself is homogeneously polarized and has a circular cross section. The transmitting electrode and receiving electrode are positioned symmetrically with respect to an axis lying in the plane of the membrane, with the axis corresponding to one diagonal of the circular surface of the piezoelectric element.

The piezoelectric element is fitted with a ground electrode approximately over the entire surface area on the face which is opposite that face of the piezoelectric element to which the electrode structure is fitted. If the membrane and the housing of the vibration detector are conductive, it is sufficient for the ground electrode to make electrical contact with the housing via the membrane. If, for safety reasons, there is no electrically conductive connection between the membrane or the housing and the piezoelectric element, then an insulating layer is arranged between the membrane and the piezoelectric element. In this case, the ground electrode is connected to ground via a connecting electrode which is arranged on that face of the piezoelectric element to which the electrode structure is fitted.

SUMMARY OF THE INVENTION

The present invention has as an object improving the transmitting/receiving unit of a vibration detector such that the influence of disturbance signals is minimized.

The object is achieved in that the transmitting/receiving unit is a piezoelectric element in the form of a disk, on whose first face an electrode structure is provided, with the electrode structure having at least two transmitting electrodes and two receiving electrodes, and with the first transmitting electrode being opposite the second transmitting electrode, and with the first receiving electrode being opposite the second receiving electrode, essentially in each case symmetrically about a point.

The solution according to the present invention at the same time results in a number of advantages:

1. The use of a piezoelectric disk as a transmitting/receiving unit means that the corresponding amount of space required in the vibration detector may be designed to be small.

2. The piezoelectric transmitting/receiving unit in the form of a disk can be manufactured relatively easily.

3. Owing to the symmetrical arrangement of the transmitting and receiving electrodes, the connections for the two electrode pairs can he interchanged and replaced without any problems. Incorrect contact with the electrodes is thus precluded.

4. The electrical contact can be made in a simple manner from one side, for example using the reflow method, since electrodes and opposing electrodes of the transmitting/receiving unit are arranged on the same face of the piezoelectric element.

According to one advantageous development of the apparatus according to the invention, the transmitting electrodes and/or the receiving electrodes of the transmitting/receiving unit have essentially the same shape. This is particularly advantageous with regard to the preferences already mentioned above, which result from a symmetrical layout of the electrode structure.

Furthermore, one preferred refinement of the apparatus according to the invention proposes that the transmitting electrodes and/or the receiving electrodes be in the form of 90° circle segments.

According to one advantageous variant of the apparatus according to the invention, the first transmitting electrode and the second transmitting electrode as well as the first receiving electrode and the second receiving electrode are of opposite polarities. An inverter is preferably used, which inverts the transmission signal which is applied to one of the two transmitting electrodes of the transmitting unit. Furthermore, one advantageous refinement of the apparatus according to the invention proposes a differential amplifier to whose inputs the received signals, which are tapped off on the two receiving electrodes, are applied. This refinement results in a considerable increase in the disturbance immunity with regard to common-mode disturbances or interference, for example mains hum or external vibration. In known apparatuses common-mode disturbances or interference have until now been precluded by providing DC isolation in the electronics. In the solution according to the invention, transformers required for DC isolation can be saved completely, which results in a significant reduction in the production costs.

According to one alternative embodiment in the apparatus according to the invention, provision is made for the transmitting electrodes and the receiving electrodes of the transmitting/receiving unit to be polarized in the same sense, with the two transmitting electrodes and the two receiving electrodes in each case being arranged symmetrically about a point with respect to one another. Disturbance signals which are caused by external vibration are eliminated, since their magnitudes are the same but they have opposite mathematical signs.

Furthermore, with regard to both variants of the apparatus according to the invention, provision is made for the piezoelectric element to be provided at least partially with a conductive coating on the second face, which is opposite the first face to which the electrode structure is fitted. This refinement may be used not only in conjunction with transmitting and/or receiving electrodes which are polarized in the same sense, but also in conjunction with transmitting and/or receiving electrodes which are polarized in the opposite sense.

In order to simplify manufacture, especially in order to make it possible to make contact with the transmitting/receiving unit in one method step, for example by a reflow method, a connecting electrode is provided on that face of the piezoelectric element to which the electrode structure is fitted and is connected in at least one area to the conductive layer, which forms the ground electrode, on the second face of the piezoelectric element.

One preferred development of the apparatus according to the invention provides for the connecting electrode to be in the form of a strip, and for that face of the piezoelectric element to which the electrode structure is fitted preferably to be subdivided into two halves with the same area.

The invention will be explained in more detail with reference to the following drawings, in which:

BRIEF DESCRIPTION OF THE DRAWINGS

FIG. 6: shows a block diagram of the second embodiment of the apparatus according to the invention, as shown in FIG. 5a and FIG. 5b.

DESCRIPTION OF THE PREFERRED EMBODIMENTS

Figure 1:
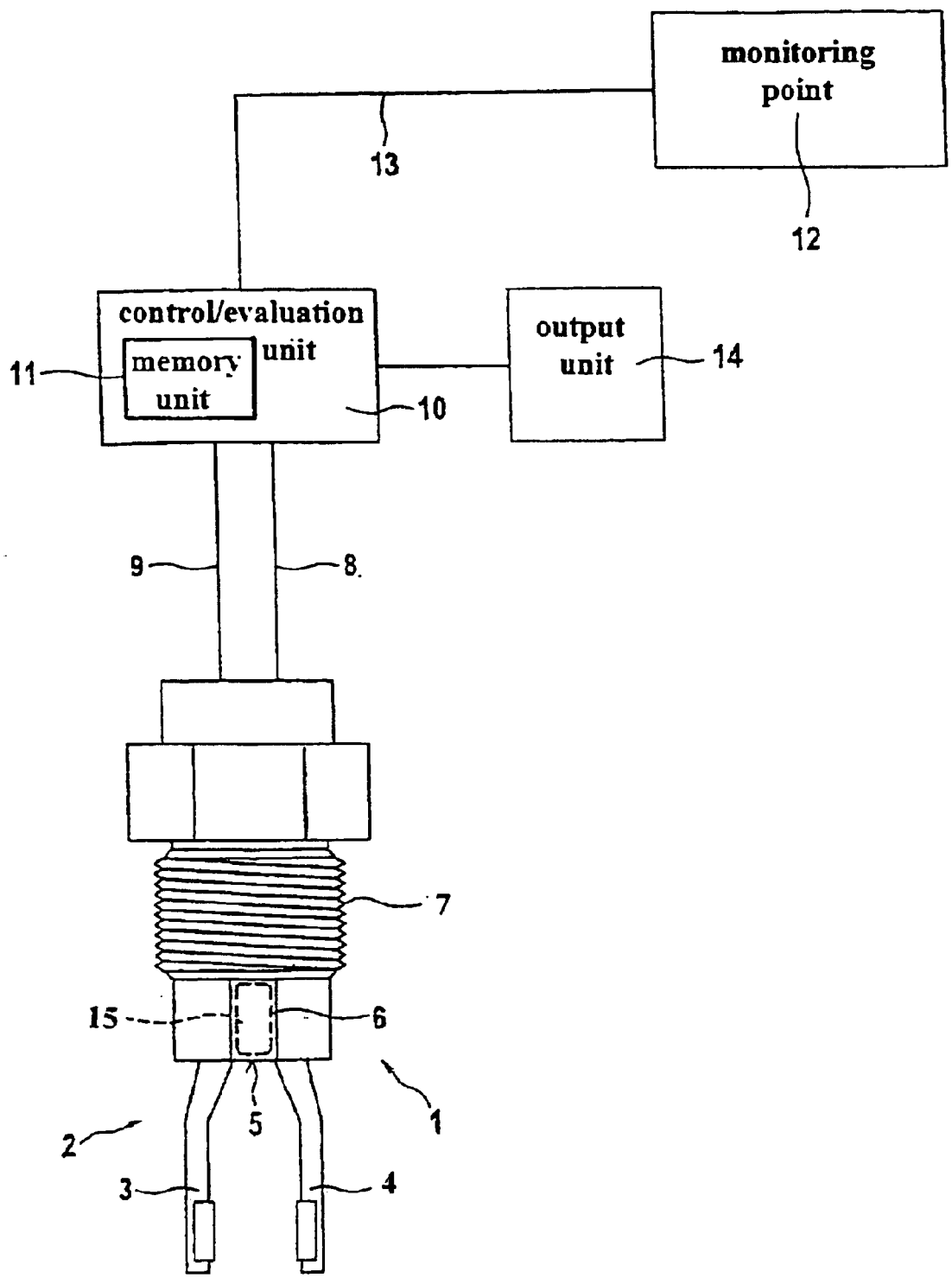
FIG. 1: shows a schematic illustration of the apparatus according to the invention.

FIG. 1 shows a schematic illustration of the apparatus according to the invention for determining and/or monitoring the filling level of a filling material in a container—the container and the filling material are not actually shown separately in FIG. 1. As has already been explained at a preceding point, the apparatus 1 which is shown in FIG. 1 is suitable not only for identifying the filling level but also for determining the density of the filling material located in the container. While, when identifying the filling level, the unit 2 which can oscillate is not immersed in the filling material and thus the filling material has reached the limit filling level, in order to monitor and/or determine the density $\rho$, it must be immersed continuously in the filling material up to a predetermined immersion depth. The container may be, for example, a tank or else a tube, through which the filling material flows.

The apparatus 1 has an essentially cylindrical housing. A thread 7 is provided on the outer surface of the housing. The thread 7 is used for attaching the apparatus 1 at the same level as a predetermined filling level, and is arranged in an appropriate opening in the container. It is self-evident that other types of attachment, for example by means of a flange, can replace the screw connection.

The housing of the vibration detector 1 is closed at its end region which projects into the container 3 by the membrane 5, with the edge area of the membrane 5 being clamped in the housing. The unit 2 which can oscillate and which projects into the container is attached to the membrane 5. In the illustrated case, the unit 2 which can oscillate is in the form of a tuning fork, and thus has two oscillating rods 3, 4, which are at a distance from one another, are attached to the membrane 5 and project into the container.

The membrane 5 is caused to oscillate by a transmitting/receiving unit 6, with the transmitting unit causing the membrane 5 to oscillate at a predetermined transmission frequency, and the receiving unit receiving the response signals from the unit 2 which can oscillate. The transmitting/receiving unit 6 according to the invention will be explained in detail in conjunction with the following figures. The oscillations of the membrane 5 also lead to oscillation of the unit 2 which can oscillate, with the oscillation frequency being different when the unit 2 which can oscillate is in contact with the filling material and there is a ground coupling to the filling material, or when the unit 2 which can oscillate is free and can oscillate without making contact with the filling material.

Piezoelectric elements change their thickness as a function of a voltage difference which is applied in a polarization direction. When an AC voltage is applied, then the thickness oscillates; when the thickness increases, then the diameter of the piezoelectric element decreases; on the other hand, when the thickness decreases, then the diameter of the piezoelectric element is enlarged in a corresponding manner.

This oscillation response of the piezoelectric element 15 means that the voltage difference causes the membrane 5 which is clamped in the housing to bend. The oscillating rods 3, 4, which are arranged on the membrane 5, of the unit 2 which can oscillate oscillate in the opposite sense about their longitudinal axis as a result of the oscillations of the membrane 5.

The electrical received signals are passed via data lines 8, 9 to the control/evaluation unit 10. The control/evaluation unit 10 has an associated memory unit 11 in which nominal values are stored. In the illustrated case, an output unit 14 is used to inform the operator that a predetermined filling level or a predetermined density has been reached. Furthermore, FIG. 1 shows the monitoring or control point 12, which is arranged remotely from the vibration detector 1. The control/evaluation unit 10 and the monitoring point 12 communicate with one another via the data line 13. Since the disturbance immunity is better, digitally based transmission is preferably used for communication. The solution according to the invention may, of course, also be integrated in a compact sensor.

Figure 2A:
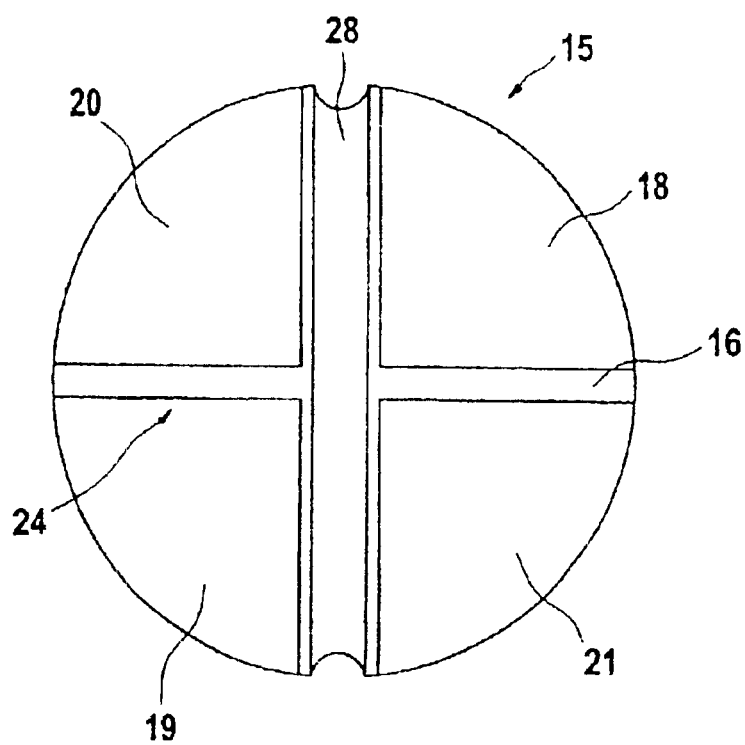
FIG. 2a: shows a plan view of the first face, to which the electrode structure is fitted, of the piezoelectric element, according to a first embodiment of the apparatus according to the invention.
Figure 2B:
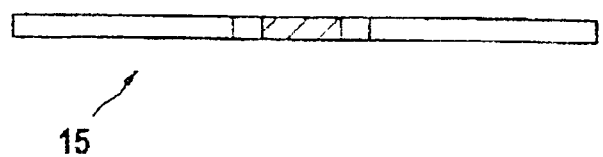
FIG. 2b: shows a side view of the piezoelectric element illustrated in FIG. 2a, FIG. 2c: shows a plan view of the second face of the piezoelectric element according to the first embodiment of the apparatus according to the invention.
Figure 2C:
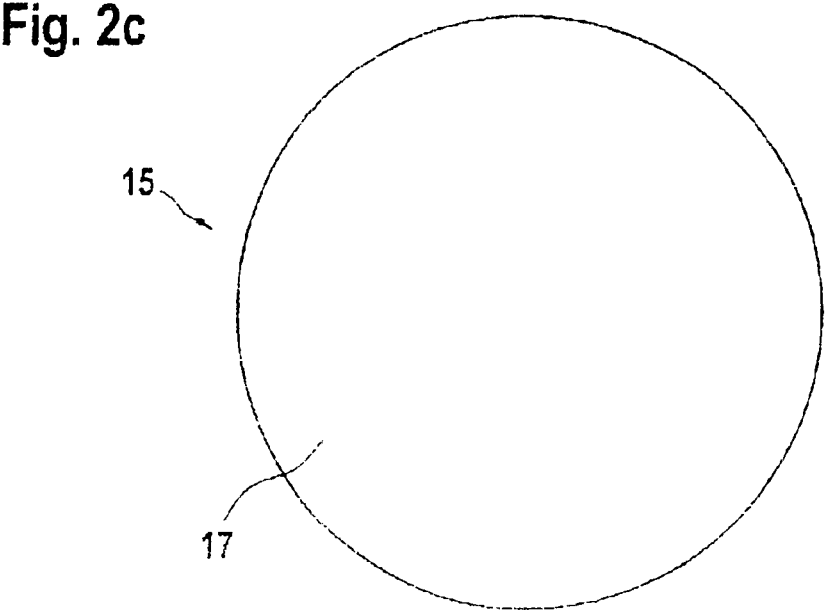

FIG. 2a shows a plan view of the first face, to which the electrode structure 24 is fitted, of the piezoelectric element 15 according to a first variant of the apparatus according to the invention. FIG. 2b shows a side view of the piezoelectric element 15 illustrated in FIG. 2a, and FIG. 2c shows a plan view of the corresponding second face 17 of the piezoelectric element 15. An electrode structure 24, comprising four electrodes 18, 19, 20, 21, is arranged on the first face 16 of the piezoelectric element 15. The electrodes 18, 19, 20, 21 in the illustrated case are four 90° circle segments, with two electrodes 18, 19; 20, 21 in each case being opposite the center of the circle, and be symmetrical about that point. Two electrodes which are opposite and are symmetrical about a point form the transmitting electrodes 20, 21; and the two remaining electrodes represent the receiving electrodes 18, 19.

As already mentioned above, a metallic layer 29, which acts as the ground electrode, is provided on the second face 17 of the piezoelectric element 15. The ground electrode is located on that face of the piezoelectric element 15 which faces the membrane 5. If the housing of the vibration detector or density sensor 1 and the membrane 5 are composed of an electrically conductive material and are at ground potential, it is sufficient for the conductive layer 29 to be connected electrically conductively to the membrane 5, for example by means of a conductive adhesive or a solder paste.

Figure 3:
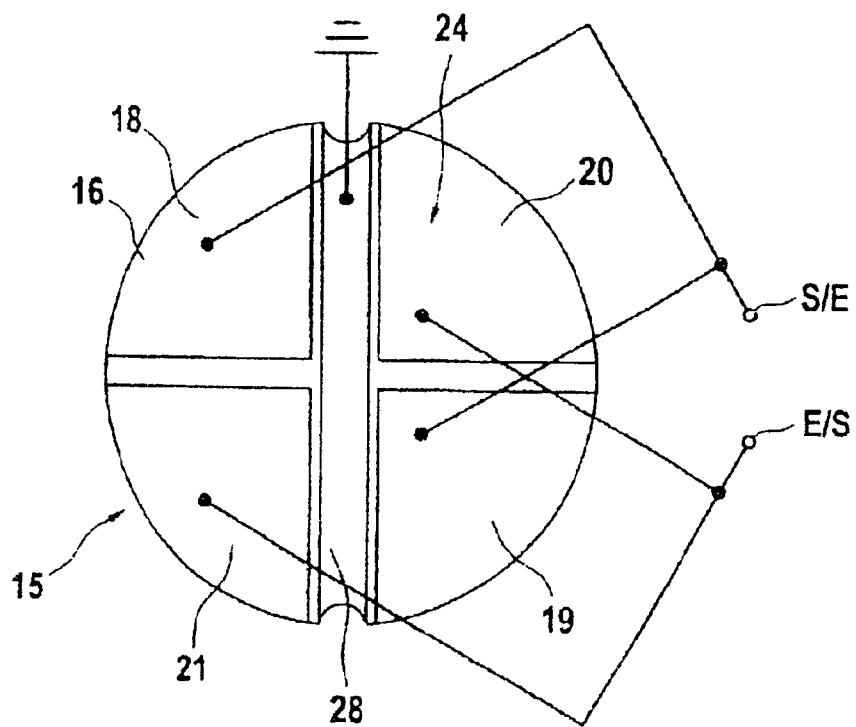
FIG. 3: shows a plan view of a preferred electrode structure according to the first embodiment of the apparatus according to the invention.
Figure 4:
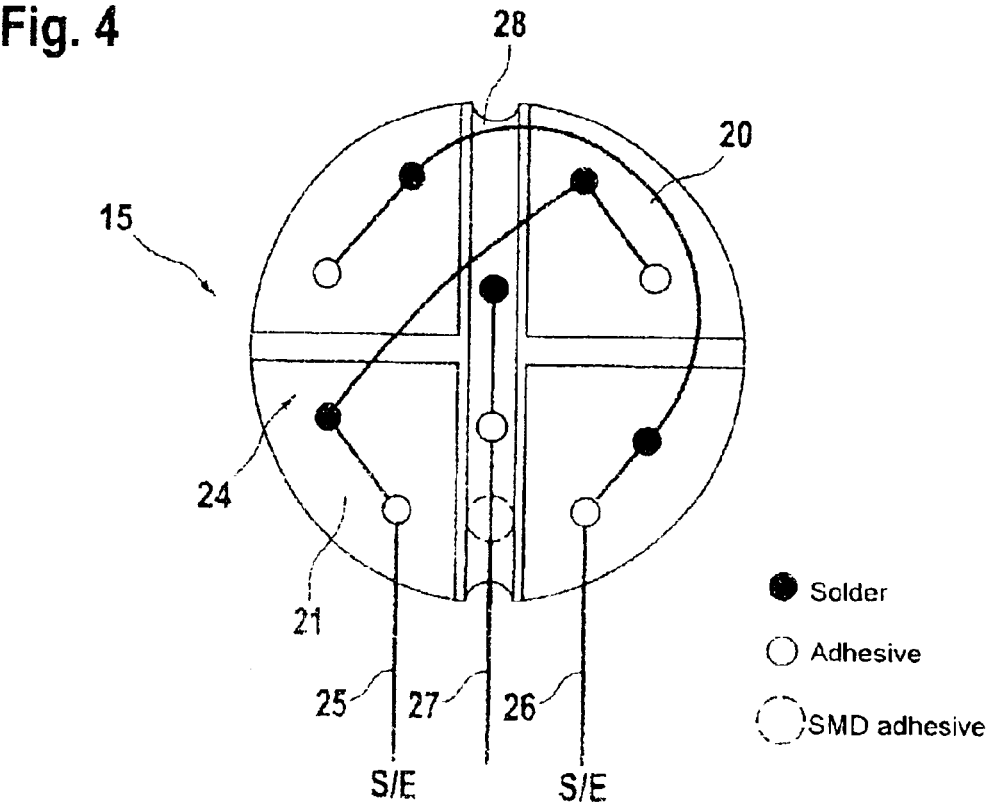
FIG. 4: shows a schematic illustration of the electrical contact-making process in the embodiment of the apparatus according to the invention illustrated in FIG. 2 to FIG. 3, FIG. 5a: shows a plan view of the first face, to which the electrode structure is fitted, of the piezoelectric element according to a second embodiment of the apparatus according to the invention.

In conjunction with the description relating to FIG. 3 and FIG. 4, reference is made to one preferred refinement of the piezoelectric element 15, which is always used whenever, for safety reasons, there must not be any conductive connection between the piezoelectric element 15 and the membrane 5 or the housing of the vibration detector 1, or when the membrane or the housing of the vibration detector 1 is composed of a nonconductive material. If necessary—as described in EP 0 985 916 A1—a dielectric material, for example in the form of a steatite disk, is arranged between the membrane 5 and the ground electrode. The corresponding disclosure content of EP 0 985 916 A1 should be regarded as part of the disclosure content of the present application.

FIG. 3 shows one preferred electrode structure 24 with two transmitting electrodes 20, 21 and two receiving electrodes 18, 19. The electrodes 18, 19, 20, 21 are polarized homogeneously. Two opposite electrodes 18, 19; 20, 21, which are symmetrical about a point, respectively form the transmitting electrodes 20, 21 and the receiving electrodes 18, 19. The symmetrical relationships in the electrode structure 24 allow the transmitting electrodes 20, 21 and the receiving electrodes 18, 19 to be interchanged and replaced without any problems. This situation is illustrated symbolically in FIG. 3 by the connection identifications E/S and S/E. The special electrode structure in conjunction with the electrodes being polarized in the same sense results in automatic elimination of common-mode disturbances or interference caused by external vibration.

FIG. 4 shows a schematic illustration of the electrical contacts in the embodiment of the apparatus according to the invention shown in FIG. 2 to FIG. 3. This type of contact is obviously also suitable for the second embodiment of the electrode structure 24 according to the invention for the piezoelectric element 15. The contact as shown in FIG. 3 to FIG. 6 between the individual electrodes 18, 19, 20, 21 and the electrode structure 24 is achieved via the conductor tracks (conductors) 25, 26, 27. The conductor tracks 25, 26, 27 are preferably integrated in a so-called flex jumper. The flex jumper is a flexible strip, via which individual conductor tracks are connected to one another. The refinement of such a flex jumper is disclosed in the already cited EP 0 985 916.

The refinement illustrated in FIG. 3 and FIG. 4, can also be seen in EP 0 985 916 A1, and allows the ground electrode to make contact with the first face 16 of the piezoelectric element 15, in the same way as the transmitting and receiving electrodes 18, 19, 20, 21. The contact with the first face 16 is made via the connecting electrode 18 which, in the illustrated case, is in the form of a broadened diagonal and, via the cylindrical outer surface of the piezoelectric element 15, makes electrical contact with the conductive layer 29 on the second face of the piezoelectric element 15. This means that it is possible to produce all the necessary contacts in a single step using a reflow method, and, of course, this leads to a considerable time and cost savings.

Figure 5A:
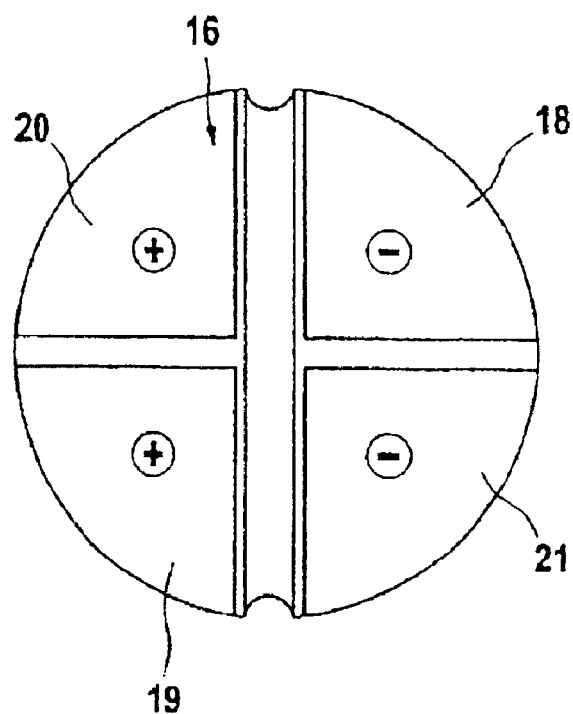
FIG. 5b: shows a plan view of the second face, to which the conductor layer is fitted, of the piezoelectric element according to the second embodiment of the apparatus according to the invention.

FIG. 5a shows a plan view of the first face 16, to which the electrode structure 24 is fitted, according to a second embodiment of the transmitting/receiving unit 6 according to the invention. The two electrodes 19, 20 on the left-hand side of the piezoelectric element 15 have the opposite polarity to the two electrodes 18, 21 on the right-hand side of the piezoelectric element 15.

Figure 5B:
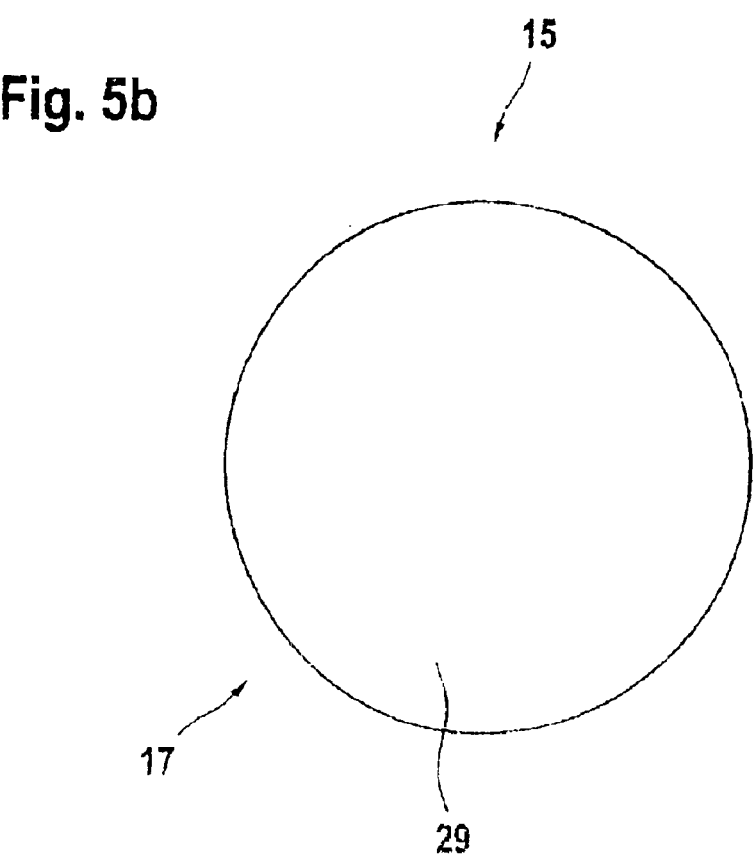

FIG. 5b shows a plan view of the second face, to which the conductive layer 29 is fitted, of the piezoelectric element 15 according to the second embodiment of the apparatus according to the invention. As already described above, the conductive layer 29 may be connected directly to ground via the conductive membrane 5 and the conductive housing. However, it is also possible for the conductive layer 29 to be at ground potential, via a connecting element 29 on the first face 16, to which the electrode structure 24 is fitted, of the piezoelectric element 15.

FIG. 6 shows a blocked diagram of the second embodiment of the apparatus according to the invention (FIG. 5a, FIG. 5b) and of the transmitting/receiving unit according to the invention The transmission signal, which is inverted via the inverter 22, is applied to the transmitting electrode 21;

the non-inverted transmission signal is applied to the transmitting electrode 20. The transmission signals which are applied to the two transmitting electrodes 20, 21 thus have the same magnitudes but have opposite mathematical signs. If a common-mode disturbance or interference σ occurs (as identified by the indexed disturbance in the figure), caused, for example, by means hum and/or by external vibration, a signal $\Sigma_1 = +\Delta E + \sigma$ is tapped off on the receiving electrode 18, and and a signal $E_2 = -\Delta E + \sigma$ is tapped off on the receiving electrode 19. Both signals are passed to the inputs of the differential amplifier 23, at whose output the signal $E = E_1 - E_2 = +2\Delta E$ is produced, from which the common-mode disturbance or interference has been removed. Disturbances and interference which in each case act or acts in the same sense on the two electrodes 18, 19; 20, 21, which are arranged symmetrically about a point, can thus be removed in a very simple and effective manner.

In fact, a block diagram of a feedback circuit for the first variant of the apparatus according to the invention has already been disclosed in EP 0 985 916 A1 which has already been cited a number of times, so that there is no need to describe this explicitly at this point.

What is claimed is:

1. An apparatus for determining and/or monitoring the filling level of a filling material in a container and for determining a process variable of a filling material in the container, comprising:

a membrane which can oscillate being fitted at the same level as the predetermined filling level;

a unit which can oscillate and is attached to said membrane said unit which can oscillate being fitted such that it enters the filling material to a defined immersion depth;

a transmitting/receiving unit which causes said membrane and said unit which can oscillate to oscillate at a pre-determined transmission frequency and which receives the oscillations from said unit which can oscillate;

a control/evaluation unit which identifies that the predetermined filling level has been reached as soon as a predetermined frequency change occurs, or which determines the density of the filling material on the basis of the oscillation frequency of the unit which can oscillate; and a differential amplifier, wherein:

said transmitting/receiving unit is a piezoelectric element in the form of a disk, on whose first face an electrode structure is provided, with the electrode structure having at least two transmitting electrodes and two receiving electrodes, and with the first transmitting electrode being opposite the second transmitting electrode, and with the first receiving electrode being opposite the second receiving electrode, essentially in each case symmetrically about a point, the inputs of said differential amplifier have the electrical signals which are tapped off from said two receiving electrodes applied, and said first transmitting electrode and said second transmitting electrode, as well as said first receiving electrode and said second receiving electrode are of opposite polarity.

2. The apparatus as claimed in claim 1, wherein:

said transmitting electrodes and/or said receiving electrodes of said transmitting/receiving unit are essentially of the same shape.

3. The apparatus as claimed in claim 1, wherein:

said transmitting electrodes and/or said receiving electrodes are in the form of 90° circle segments.

4. The apparatus as claimed in claim 1, further comprising:

an inverter, which inverts the electrical signal which is applied to one of said two transmitting electrodes of said transmitting/receiving unit.

5. The apparatus as claimed in claim 1, wherein:

said piezoelectric element is provided at least partially with a conductive coating on said second face, which is opposite said first face to which said electrode structure is fitted.

6. The apparatus as claimed in claim 5, further comprising:

a connecting electrode provided on said first face, to which said electrode structure is fitted, of the piezoelectric element and is connected in at least one area to said conductive coating, which forms the ground electrode, on said second face of said piezoelectric element.

7. An apparatus for determining and/or monitoring the filling level of a filling material in a container and for determining a process variable of a filling material in the container, comprising:

a membrane which can oscillate being fitted at the same level as the predetermined filling level;

a unit which can oscillate and is attached to said membrane said unit which can oscillate being fitted such that it enters the filling material to a defined immersion depth;

a transmitting/receiving unit which causes said membrane and said unit which can oscillate to oscillate at a pre-determined transmission frequency and which receives the oscillations from said unit which can oscillate;

a control/evaluation unit which identifies that the predetermined filling level has been reached as soon as a predetermined frequency change occurs, or which determines the density of the filling material on the basis of the oscillation frequency of the unit which can oscillate; and a connecting electrode, wherein;

said transmitting/receiving unit is a piezoelectric element in the form of a disk, on whose first face an electrode structure is provided, with the electrode structure having at least two transmitting electrodes and two receiving electrodes, and with the first transmitting electrode being opposite the second transmitting electrode, and with the first receiving electrode being opposite the second receiving electrode, essentially in each case symmetrically about a point, said piezoelectric element is provided at least partially with a conductive coating on said second face, which is opposite said first face to which said electrode structure is fitted, and said connecting electrode is provided on said first face, to which said electrode structure is fitted, of the piezoelectric element, and is connected in at least one area to said conductive coating, which forms the ground electrode, on said second face of said piezoelectric element.

* * * * *